(12) United States Patent
Eggert et al.

(10) Patent No.: US 6,262,559 B1
(45) Date of Patent: Jul. 17, 2001

(54) PORTABLE AUXILIARY CHARGING BATTERY PACK FOR THIN METAL FILM BATTERY POWER PACK

(75) Inventors: Daniel M. Eggert; Thomas P. Becker, both of Kenosha, WI (US)

(73) Assignee: Snap-on Technologies, Inc., Lincolnshire, IL (US)

(*) Notice: Subject to any disclaimer, the term of this patent is extended or adjusted under 35 U.S.C. 154(b) by 0 days.

(21) Appl. No.: 09/611,045

(22) Filed: Jul. 6, 2000

(51) Int. Cl.[7] .................................. H02J 7/00; H02J 7/34
(52) U.S. Cl. ............................................. 320/103; 307/48
(58) Field of Search ........................... 320/103, 104, 320/106, 135; 307/64, 66, 44, 49

(56) References Cited

U.S. PATENT DOCUMENTS

| | | |
|---|---|---|
| 4,121,115 | 10/1978 | de Mere . |
| 4,857,820 | 8/1989 | Tompkins et al. . |
| 5,107,197 | 4/1992 | Arlinghaus . |
| 5,250,891 | 10/1993 | Glasgow . |
| 5,281,904 | 1/1994 | Tomkins . |
| 5,568,038 | * 10/1996 | Tatsumi ................................ 320/103 |
| 5,677,614 | 10/1997 | Ohmori et al. . |
| 5,686,809 | * 11/1997 | Kimura et al. ....................... 320/101 |
| 5,883,491 | * 3/1999 | Silverman ............................ 320/104 |
| 6,002,235 | * 12/1999 | Clore .................................... 320/105 |

OTHER PUBLICATIONS

Boulder Technologies Corporation, "SecureStart™ Owner's Manual for all SS 101 Series Models" revised 2/00, see the entire document.*

Brochure for Bolder "SecureStart" Battery Pack (prior to Jun. 1, 1999).

* cited by examiner

Primary Examiner—Peter S. Wong
Assistant Examiner—Gregory J Toatley, Jr.
(74) Attorney, Agent, or Firm—Seyfarth Shaw

(57) ABSTRACT

A keeper battery pack includes a housing incorporating an array of series-connected alkaline battery cells coupled to a cable extending outside the housing and terminating in a quick-connect connector plug adapted to plug into the charger port of a portable lead-acid battery power pack of the type used for jump-starting automotive vehicles. The keeper pack is portable and can maintain the charge on the battery power pack during extended periods of non-use, such as during storage, transportation and the like.

19 Claims, 2 Drawing Sheets

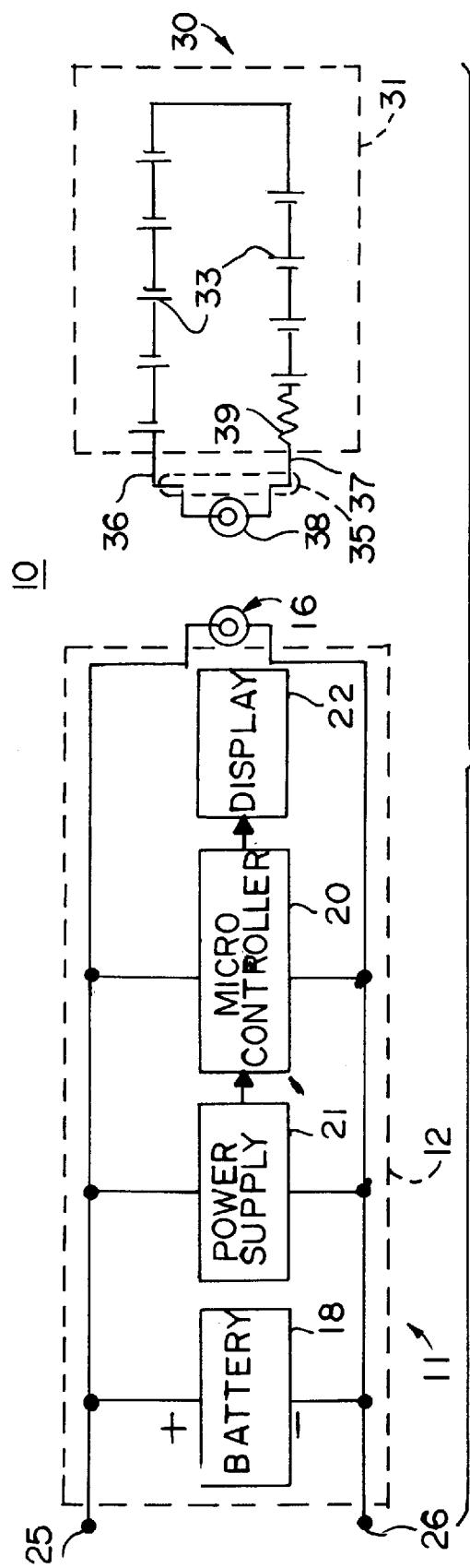
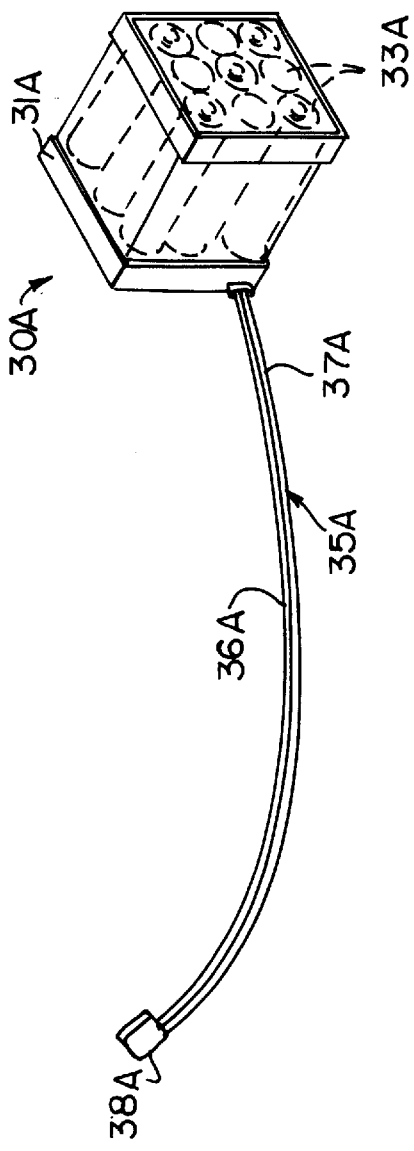
FIG. 2
FIG. 3

PORTABLE AUXILIARY CHARGING BATTERY PACK FOR THIN METAL FILM BATTERY POWER PACK

BACKGROUND

This application relates to battery power packs of the type used for jump-starting automotive vehicles and, in particular, to lead-acid battery packs of the thin metal film type. The application relates in particular to charge maintenance in such battery power packs.

It is known to provide portable battery power packs for providing DC power in emergency situations and/or remote locations, such as for the purpose of jump-starting automotive vehicle engines, the batteries of which have become discharged for some reason. Such battery power packs typically include lead-acid batteries of a capacity to provide DC voltage and current sufficient for starting an automotive vehicle engine. Battery powerpacks are typically rechargeable and, since lead-acid batteries can become irreparably damaged if their voltage drops below a predetermined value, it is desirable that they be recharged after each use. A simple way of recharging such a battery power pack is to leave it connected to the battery of the vehicle being jump-started so that, after the vehicle engine starts, the battery power pack can be recharged by the vehicle charging system (alternator or generator). Prior battery packs have also been provided with auxiliary charger ports so that they can be connected to free-standing chargers when not connected to the vehicle.

However, lead-acid battery packs can also undergo a significant amount of self-discharge during extended periods of non-use, such as during storage, transportation or the like. Accordingly, it is also known to provide a lead-acid battery power pack with a built-in set of alkaline batteries to provide a "keeper" charge current through a diode and a resistance to make up for self discharge while "on the shelf." However, such built-in keeper charge systems add to the size, weight, complexity and overall cost of the battery power pack. Thus, the designer of the battery power pack is faced with a decision to reduce the size of the keeper batteries to minimize size, weight, cost and the like, while also minimizing the length of time that the charge of the battery power pack can be maintained, or increasing the size of the keeper batteries to lengthened the time that the charge can be maintained on the battery power pack, at the expense of added size, cost, weight and the like.

SUMMARY

This application describes a system which avoids the disadvantages of prior battery power packs while affording additional structural and operating advantages.

An important feature is the provision of a system which affords a technique for maintaining the charge in a battery power pack during extended periods of non-use, without adding to the size or weight of the battery power pack.

Another feature is the provision of a system of the type set forth which utilizes an auxiliary portable keeper battery pack which can be easily quick-coupled to and decoupled from the battery pack, and which is of simple and economical construction.

Certain ones of these and other features may be attained by providing a portable keeper battery pack for providing a keeper charge to a battery power pack which has a charger port, the keeper battery pack comprising: a housing, an array of interconnected alkaline battery cells disposed in the housing, and a cable having an inner end connected to the array within the housing and an outer end disposed outside the housing and provided with a quick-connect connector removably electrically connectable to the charger port.

BRIEF DESCRIPTION OF THE DRAWINGS

For the purpose of facilitating an understanding of the subject matter sought to be protected, there are illustrated in the accompanying drawings preferred embodiments thereof, from an inspection of which, when considered in connection with the following description, the subject matter sought to be protected, its construction and operation, and many of its advantages should be readily understood and appreciated.

FIG. 2 is a partially schematic and partially functional block diagram of the circuitry of the system of FIG. 1; and FIG. 3 is a perspective view of an alternative form of keeper battery pack.

DETAIL DESCRIPTION

Figure 1:
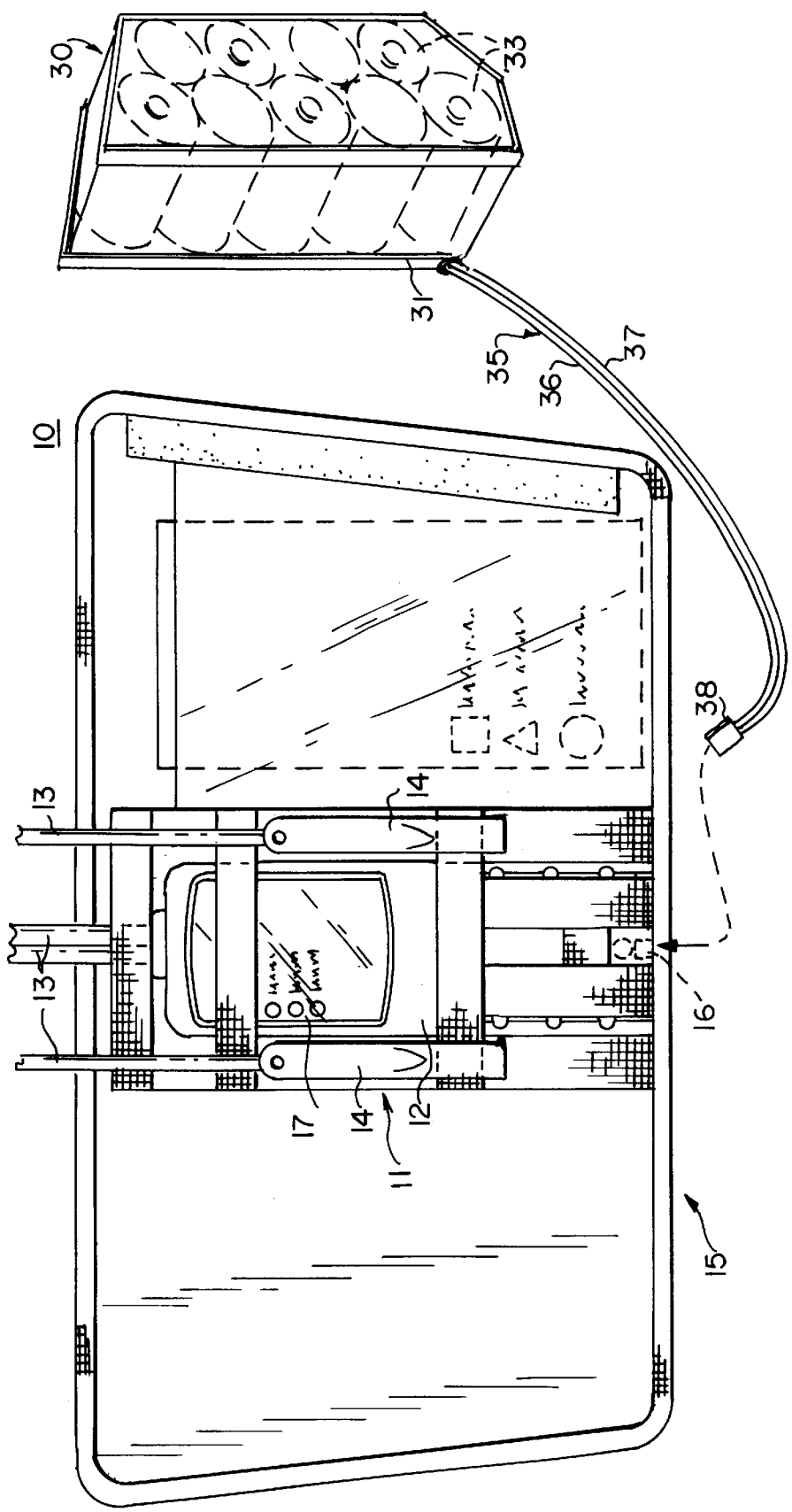
FIG. 1 is a view, partially in front elevation and partially perspective, of a system including a battery power pack and a keeper battery pack.

Referring to FIGS. 1 and 2, there is illustrated a battery pack system, generally designated by the numeral 10, including a battery power pack 11 and a keeper battery pack 30. The battery power pack 11 may be of known construction and includes a housing 12 connected by cables 13 to a pair of connector clamps 14, which can be respectively clamped onto the terminals of an automotive battery for purposes of jump-starting an associated vehicle engine, in a known manner. The battery power pack 11 is illustrated as disposed in an associated carrying pouch 15, both of which may be of the type disclosed in the copending U.S. application Ser. No. P-101,966, filed Feb. 11, 2000 and entitled "Battery Pack and Protective Pouch Therefor." The housing 12 has a charger port 16 at one end thereof in the nature of a socket into which an associated charging device may be plugged. The housing 12 may be provided with a display window 17 for an associated LCD display or the like coupled to suitable electronics in the housing 12. Also disposed in the housing 12 is a battery 18 (FIG. 2) which may include one or more lead-acid cells, preferably of the thin metal film type.

Referring in particular to FIG. 2, the battery power pack 11 also includes a microcontroller 20 connected across the terminals of the battery 18, and a suitable power supply 21 also connected across the battery terminals 18 and also connected to the microcontroller 20 for providing a suitable operating voltage thereto. The microcontroller 20 is also connected to a suitable display 22, which may be an LCD display and may be disposed in use beneath the display window 17 so as to be viewable therethrough. The terminals of the battery 18 are connected to output terminals 25 and 26, respectively connected to the cables 13, and also connected to terminals of the charger port 16, which may be coaxial.

The keeper battery pack 30 has a housing 31 enclosing a plurality of series-connected alkaline cells 33, sufficient in number to generate an output voltage approximating a nominal normal operating voltage of the battery 18, in this case between 12 and 13 volts. In the illustrated embodiment the cells 33 are C-cells or D-cells, each capable of generating 1.5 volts. Accordingly, nine such cells are connected in series in the housing 31 to produce an output voltage of 13.5 volts. Thus, the cells 33 form a series array with end terminals respectively connected to conductors 36 and 37, which form a cable 35 extending outside the housing 31 and connected at its distal end to a plug connector 38, which may be of the coaxial type, and is adapted to be plugged into the charger port 16 of the battery power pack 11. A current limiting resistor 39 may be connected in series with the cells 33.

In operation, if the battery power pack 11 is to be "on the shelf" for an extended period of time, the keeper pack 30 may be connected thereto by plugging the plug connector 38 into the charger port 16, whereupon the keeper battery pack 30 will provide a continuous trickle or keeper charge to the battery 18 to counteract the self discharge thereof, maintaining the nominal output voltage of the battery 18 and preventing its charge level from dropping to a dangerous level. The alkaline cells are easily replaceable when they become exhausted and the keeper battery pack 30 may be kept at the place of storage or transportation of the battery power pack 11 and connected thereto only when needed.

Referring to FIG. 3, there is an alternative keeper battery pack 30A which is similar to the keeper battery pack 30, wherefore like parts bear the same reference numerals with the suffix "A." The keeper battery pack 30A has a size and shape which are different from those of the pack 30, being in this case substantially rectangular and of a suitable size for housing nine 1.5-volt cells of the "AA" size. While the keeper battery pack 30A does not have the current capacity of the keeper battery pack 30, it has the advantage of small size, weight and expense. Otherwise, it works in the same manner described above for the keeper battery pack 30.

From the foregoing it can be seen that there has been provided an improved battery pack system which permits charge maintenance of a lead-acid battery pack 11 without affecting the size or weight thereof.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

We claim:

1. A portable keeper battery pack for providing a low-current keeper charge to a battery power pack which has a charger port, the keeper battery pack comprising:

a housing, an array of interconnected alkaline battery cells disposed in the housing, a current-limiting circuit for limiting current deliverable from the alkaline cells to a trickle level, and a cable having an inner end connected to the array within the housing and an outer end disposed outside the housing and provided with a quick-connect connector removably electrically connectable to the charger port.

2. The battery pack of claim 1, wherein each of the battery cells is a 1.5-volt cell.

3. The battery pack of claim 2, wherein the array includes nine alkaline battery cells.

4. The battery pack of claim 1, wherein each of the battery cells is a C-cell.

5. The battery pack of claim 1, wherein each of the battery cells is a AA-cell.

6. The battery pack of claim 1, wherein each of the battery cells is a D-cell.

7. The battery pack of claim 1, wherein the battery cells are connected in series.

8. The battery pack of claim 7, wherein the current-limiting circuit includes a current-limiting resistor in series with the battery cells.

9. The battery pack of claim 1, wherein the cable includes a pair of conductors respectively connected to positive and negative terminals of the array.

10. A battery pack system comprising:

a battery power pack including a first housing, at least one lead-acid battery cell disposed in the first housing, a pair of connector clamps disposed outside the first housing, a pair of first cables respectively connecting the clamps to the at least one lead-acid battery cell, and a charger port on the first housing electrically connected to the at least one lead-acid battery cell; and a keeper battery pack for providing a low-current keeper charge and including a second housing, an array of interconnected alkaline battery cells disposed in the second housing, a current-limiting circuit for limiting current deliverable from the alkaline cells to a trickle level, and a second cable having an inner end connected to the array within the second housing and an outer end disposed outside the housing and provided with a quick-connect connector removably electrically connectable to the charger port.

11. The system of claim 10, wherein each of the battery power pack and the keeper battery pack is portable.

12. The system of claim 10, wherein the at least one lead-acid battery cell is a thin metal film cell.

13. The system of claim 10, wherein the at least one lead-acid battery cell produces a nominal output voltage of approximately 12 volts.

14. The system of claim 10, wherein the alkaline battery cells include nine series-connected 1.5-volt cells.

15. The system of claim 14, wherein the 1.5-volt cells are AA-cells.

16. The system of claim 14, wherein the 1.5-volt cells are C-cells.

17. The system of claim 14, wherein the 1.5-volt cells are D-cells.

18. The system of claim 14, wherein the current-limiting circuit includes a current-limiting resistor in series with the battery cells.

19. The system of claim 10, wherein the second cable includes two conductors respectively connected to positive and negative terminals of the array.

* * * * *